(12) United States Patent
Savant

(10) Patent No.: US 6,382,484 B1
(45) Date of Patent: May 7, 2002

(54) GUN BOOT MOUNT FOR ATV

(76) Inventor: Kevin D. Savant, P.O. Drawer 20, Kinder, LA (US) 70648

( * ) Notice: Subject to any disclaimer, the term of this patent is extended or adjusted under 35 U.S.C. 154(b) by 0 days.

(21) Appl. No.: 09/802,362

(22) Filed: Mar. 10, 2001

(51) Int. Cl.[7] ................................................ B60R 9/00
(52) U.S. Cl. ..................... 224/401; 224/282; 224/431; 224/445; 224/501; 224/502; 224/506; 224/913
(58) Field of Search ................................ 224/401, 408, 224/410, 413, 431, 442, 445, 282, 501, 502, 505, 506, 913; 211/64

(56) References Cited

U.S. PATENT DOCUMENTS

| | | | | |
|---|---|---|---|---|
| 3,744,687 A | * | 7/1973 | Oreck | 220/8 |
| 4,823,673 A | * | 4/1989 | Downing | 224/401 |
| 5,476,188 A | * | 12/1995 | Hassenpflug | 190/104 |
| 5,706,990 A | * | 1/1998 | Lahrson | 211/64 |
| 5,878,929 A | * | 3/1999 | Leonard | 211/64 |
| 6,021,936 A | * | 2/2000 | Savant | 224/282 |
| 6,086,031 A | * | 7/2000 | Renfro | 182/187 |

* cited by examiner

Primary Examiner—Stephen K. Cronin
(74) Attorney, Agent, or Firm—Robert N. Montgomery

(57) ABSTRACT

A gun-mounting bracket for ATV's adaptive to a variety of cargo racks generally employed by ATV's and further providing adaptability to a wide range of gun scabbards or boots designed for a variety of different type guns. The bracket includes a base plate member having a plurality of holes and slots which may be used in combination with U-bolts and clamps for attachment, an interchangeable pivotal plate member which provides a method for rotating the boot to angular positions relative to the base plate, and an interchangeable bracket member attached perpendicular thereto adapted to receive the barrel portion of the gun boot. The bracket member, having an elongated opening for receiving the barrel portion of the gun boot, is provided with a polymeric edge molding and allows the barrel portion of the gun boot to extend therethrough to a point which generally positions the boot relative to the bracket and its bar latch member. The bar latch and its retaining pin arrangement, secured to the pivotal plate, is positional and cooperative with a retaining loop generally found approximately midway along the base of most rigid gun boots.

18 Claims, 5 Drawing Sheets

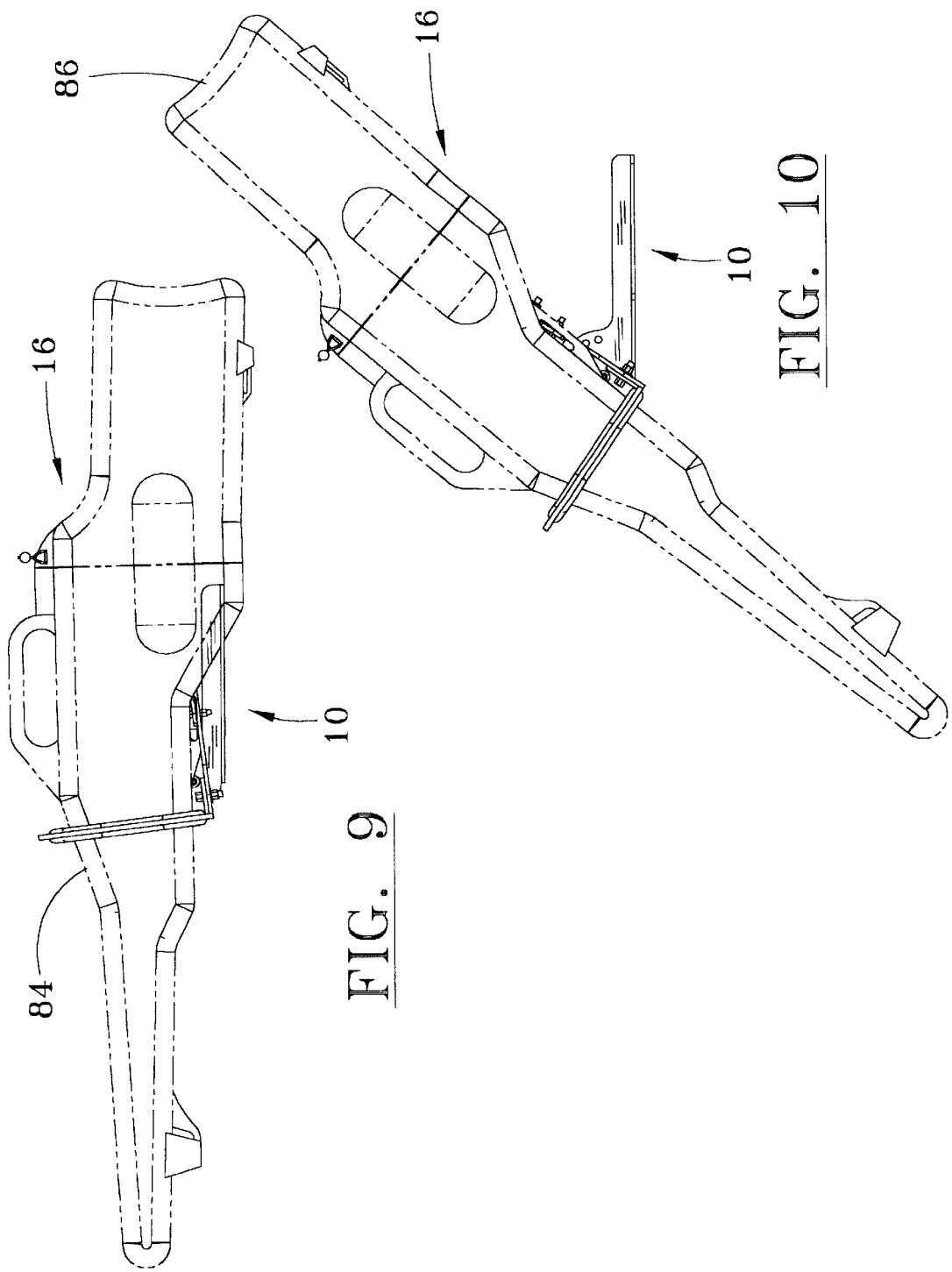

GUN BOOT MOUNT FOR ATV

BACKGROUND OF THE INVENTION

1. Field of the Invention

This invention relates generally to gun mounting brackets for all-terrain vehicles (ATV) and more particularly to a mounting bracket universally adapted to ATV's for retaining various lockable type rigid gun boots.

2. General Background

Equipment racks and various types of gun mounts that are adaptable to ATV's are well known within the art. Guns, such as rifles and shotguns, have been carried in scabbards for attachment to horse saddles for a great many years. However, more recently such scabbards have become more sophisticated by providing a rigid, padded case which totally encloses the gun and further locking the case, thereby protecting the gun environmentally and thwarting theft. Gun boots have been adapted for use in numerous applications such as for fixed attachment to tree stands as disclosed by U.S. Pat. No. 5,476,188. Rigid gun boots are now becoming more elaborate and are being used more widely, thus requiring additional methods for mounting them for transport to hunting and campsites. One such method is disclosed for adaptation and transport by ATV's in U.S. Pat. No. 5,706,990. This arrangement provides a universal bracket mountable to the cargo rack of the ATV and provides an attachment for a specific type of rigid gun boot or scabbard configured to be paired with the mounting bracket. There is also provided a method for pivoting the scabbard from a horizontal position to an angular position. This apparatus requires the hunter to purchase both the scabbard and the bracket as a mated unit and is even further limited to the type of gun for which the scabbard is designed. Therefore, a need exists for a bracket adaptable to ATV's that allows for universal adaptable mounting of a variety of gun scabbards or boots, removably locking the boot securely to the mounting bracket, and providing additional positioning.

SUMMARY OF THE INVENTION

The gun mounting bracket for ATV's disclosed herein provides for the adaptation of the bracket to a variety of cargo racks generally employed by ATV's and further provides adaptability of a wide range of gun scabbards or boots designed for a variety of different type guns. The bracket includes a base plate member having a plurality of holes and slots which may be used in combination with U-bolts and clamps for attachment to luggage or cargo racks fixed to various types of ATV's, a pivotal plate or elevation member which provides a method for rotating the boot to angular vertical positions and a vertical bracket member having an elongated opening therein adaptable to fit a specific type of gun boot. The elongated opening is fitted with a polymeric protective edging configured to fit snuggly and securely around the barrel portion of a rigid gun scabbard or boot fitted therein at a point which generally positions the boot relative to the bracket and its latching mechanism.

A latch bar and pin arrangement, mounted on the pivotal plate, is provided which is cooperative with a retaining loop generally found approximately mid way along the base of most rigid gun boots. The latch being positional relative to the bracket for mating with the boot's retaining loop depending on the type and size of the gun boot. The base bracket may be mounted on a variety of cargo racks and in a variety of positions that it offer the least obstruction to the rider, while providing easy access to the gun.

It should be noted that the pivotal bracket member is interchangeable with a number of specifically configured pivotal brackets, each of which may be adapted to mate with vertical members having an elongated opening configured to fit specific rigid gun cases or holsters. One such interchangeable bracket member is described in my previous U.S. Pat. No. 6,021,936.

These essentials and their operating advantages will become more evident when taken together with the following descriptions and drawings

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein illustrations shown with phantom or dashed lines represent the prior art not claimed herein;

FIG. 9 is a side elevation view of the pivotal bracket shown in the horizontal position relative the base plate; and FIG. 10 is a side elevation of the pivotal bracket shown pivoted in the uppermost angular position.

DETAIL DESCRIPTION OF THE PREFERRED EMBODIMENT

Figure 1:
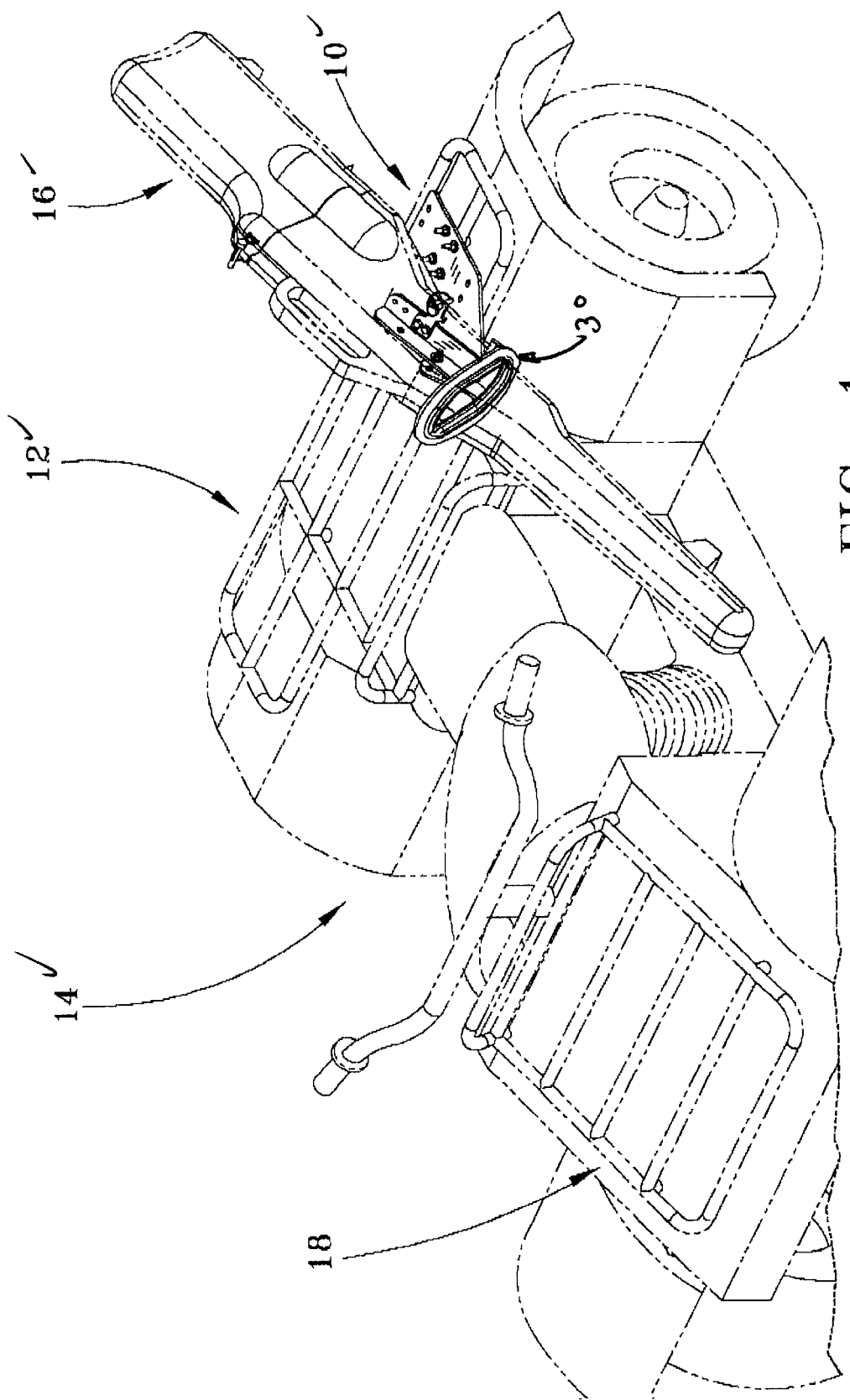
FIG. 1 is an isometric assembly view illustration of the preferred bracket embodiment, in conjunction with a gun boot, and an ATV (shown in phantom)
Figure 2:
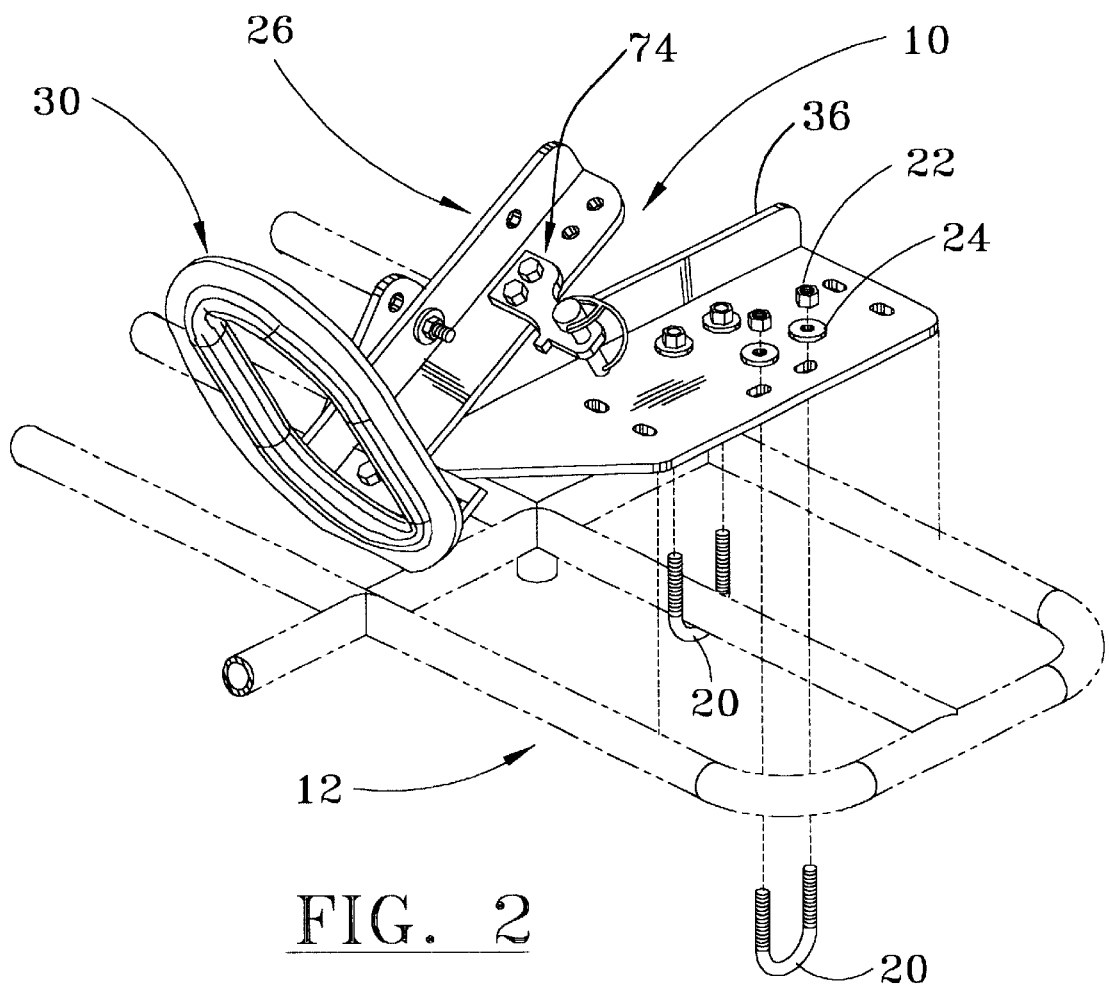
FIG. 2 is an isometric view of the preferred bracket embodiment illustrating a method of mounting the bracket to a portion of an ATV cargo rack (shown in phantom)

As illustrated in FIG. 1 the preferred bracket embodiment 10 may be mounted to the cargo rack assembly 12, shown attached to an ATV, 14 and further illustrates how a rigid gun boot 16 would be carried thereby. The bracket 10 can just as easily be mounted on the far side of the rack 12 or crossways, if desired. The gun boot bracket 10 may also be mounted to the front rack 18. As seen in FIG. 2 the bracket assembly 10 is mountable with U-bolts 20 and nuts and washers 22,24. However, it is anticipated that other types of fasteners and clamps could be used as well to accommodate various types of rack mounting requirements. The pivotal adapter assembly 26 is attached to a vertical portion 36 of the base plate assembly 32 and is pivotal relative to the base plate assembly 32.

Figure 3:
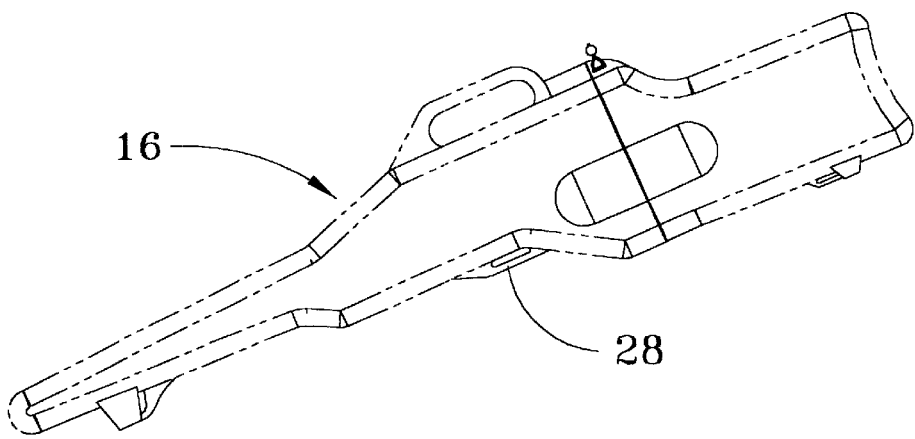
FIG. 3 is a side elevation view of a typical rigid gun boot arrangement (shown in phantom)
Figure 4:
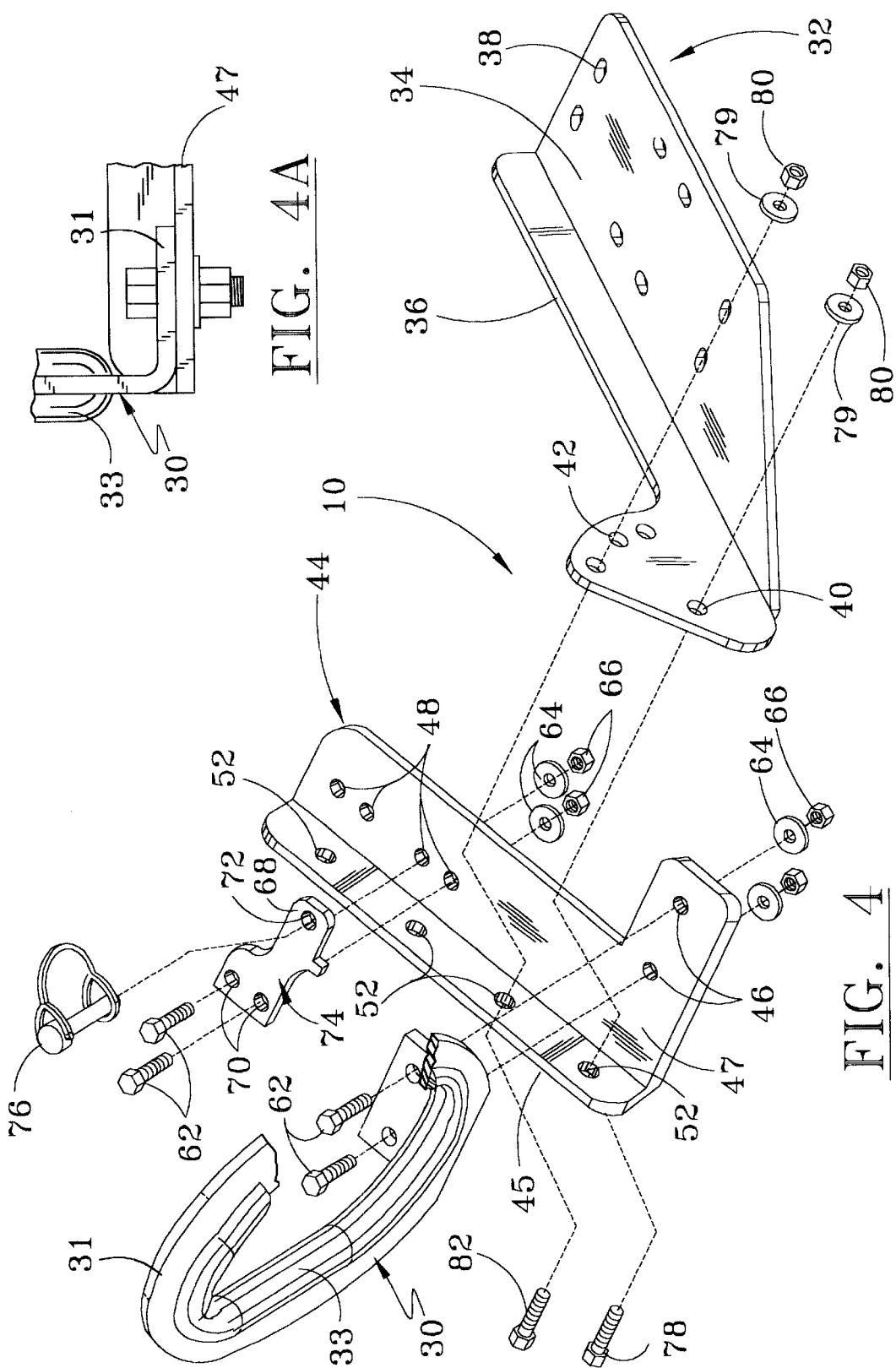
FIG. 4 is an exploded view of the preferred bracket embodiment.

A latch bar assembly 74 is attached to the horizontal portion 47 of the pivotal adapter 26 as seen ink FIG. 4 and positional between first and second positions with holes 48. The latch bar assembly 74 coincides with an elongated opening in retaining loop 28, generally found on rigid gun boot assemblies 16 as seen in FIG. 3, when the boot is inserted into the elongated opening in vertical adapter assembly 30, as shown in FIG. 1, and provides positive locking of the boot 16 to the bracket assembly 10. A retaining pin 76 or other locking devices further secure the gun boot 16 to the latch bar assembly 74.

As seen in FIG. 4, the bracket 10 includes a base plate or mounting assembly 32 having a horizontal portion 34 and a vertical portion 36. The base portion 34 further includes a plurality of holes 38 and may include slots for accommodating fasteners, such as U-bolts 20 and the like. The vertical portion 36 includes a series of holes with one being a pivotal hole 40 and a plurality of positioning holes 42. The bracket assembly 10 further includes a pivotal adapter plate member 44 also having, a horizontal portion 47 and a vertical portion 45. The horizontal portion 47 has mounting holes 46 for bracket member 30; the vertical portion also having a plurality of pivotal and positioning holes 52 which coincide with holes 40 and 42 in the vertical portion 36 of the base member 32. The pivotal adapter assembly 26 further includes a vertical bracket assembly 30 consisting of formed bracket member 31 having an elongated opening therein lined with a polymeric edge molding 33. The bracket assembly is attached perpendicular to the pivotal adapter with fasteners 62 and retained by washers and nuts 64 and 66.

The latch assembly 74, having a finger portion 68 and a lock pin hole 72, is attached to the pivotal adapter plate 44 with additional bolts 62 and their washers and nuts 64 and 66 passing through holes 70 and one pair of holes 48, depending on which position is desirable, and a safety locking pin 76 passing through holes 72. The pin 76 may be replaced with a padlock if desired. The pivotal adapter plate 44 is attached to the base plate assembly 32 by pivot bolt 78 passing through the first or third holes 52 in the adapter member vertical portion 45 and hole 40 in the base plate vertical portion 36 and secured thereto with washers and nuts 79, 80 and secured in position angularly with positioning bolt 82, also secured with a washer and nut 79, 80 or a safety pin 76.

Figures 5, 6:
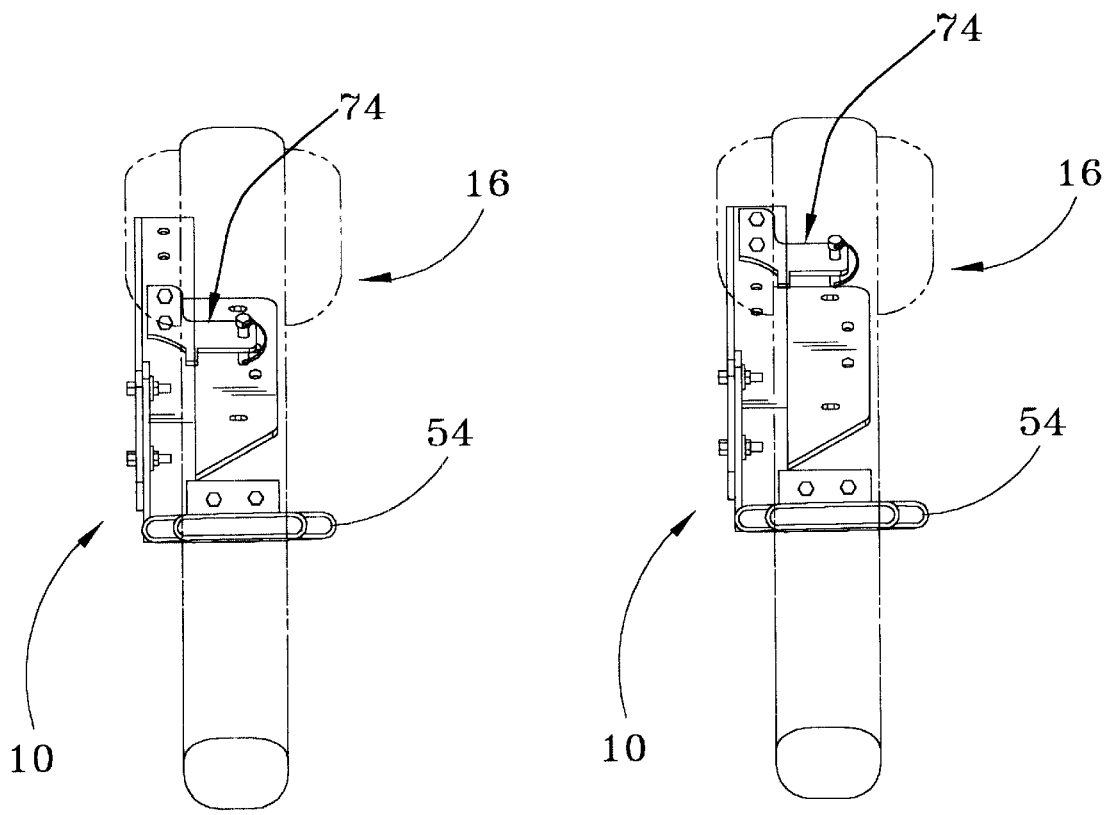
FIG. 5 is a top view of the preferred embodiment with latch bar in $1^{st}$ position.
FIG. 6 is a top view of the preferred embodiment with latch bar in $2^{nd}$ position.
Figures 7, 8:
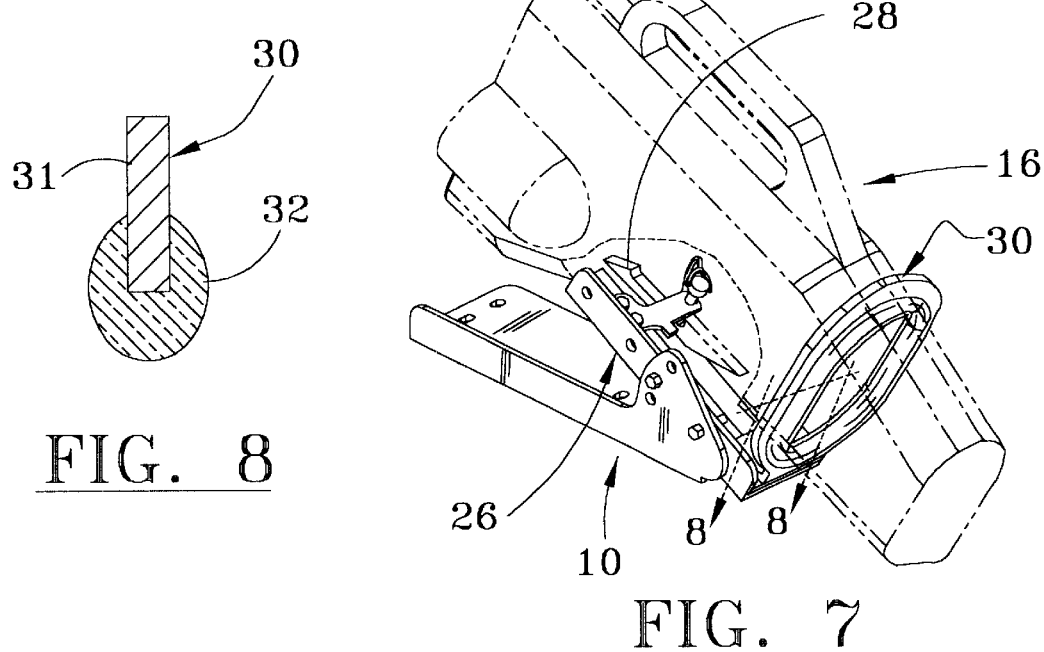
FIG. 7 is an isometric side elevation view of the preferred embodiment with partial view of a gun boot.
FIG. 8 is a cross section view of the edge molding taken along sight line 8—8 in FIG. 7.

As seen in FIG. 5 the latch assembly 74 is shown in the first position in and in the second position in FIG.6, which generally coincides with the retaining loop 28 located on the underside of the gun boot 16, as shown in FIG. 3. The position of the boot loop 28 may vary depending on the type and shape of the boot, thus necessitating repositioning of the latch bar assembly 74. With the gun boot 16 in position, as seen in FIG. 7, additional security is achieved by the insertion of the locking pin 76 or a padlock.

As indicated above, a polymeric edge molding 33 is provided to line the elongated opening in the vertical adapter bracket 30 to insure a snug fit around the gun boot 16 and to prevent marring of the boot. With the gun boot 16 in place, the pivot plate 44 may be positioned and secured in the horizontal position, as seen in FIG. 9, or pivoted to one of three angular positions, as seen in FIG. 10.

It should also be noted that the conical configuration 84 of the gun boot, seen in FIG. 9, determines the penetration of the boot 16 through the opening in the adapter bracket member 30 and thus locates the boot retaining loop 28 relative to the latch bar assembly 74. Therefore, repositioning of the pivotal adapter assembly 44 relatively to the base member 32 may also be necessary to align the latch bar 74 and the boot retaining loop 28 as discussed above. It should also be noted that the rigid gun boots 16 are generally configured so that the rear or butt portion 86 of the boot, as seen in FIG. 10, is detachable, thus allowing access to a gun located therein.

As seen herein, a variety of gun boots or scabbards 16 may be accommodated by the bracket 10, be held securely in a variety of positions, and attached in a variety of places on cargo racks attached to an ATV. The bracket further allows for convenient access to guns carried within the gun boots 16. However, each rigid gun manufacturer may have a different boot configuration. Therefore, it may become necessary to interchange the pivotal adapter member assembly 44 and or reconfigure the vertical bracket member 30 to accommodate the various manufacturers or models. Retaining the base assembly 32 while providing substitutions or modifications of the adapter members 30 and 44 enhances the versatility of the mounting assembly 10.

Because many varying and different embodiments may be made within the scope of the inventive concept herein taught, and because many modifications, may be made in the embodiments herein detailed in accordance with the descriptive requirement of the law, it is to be understood that the details herein are to be interpreted as illustrative and not in any limiting sense.

What is claimed is:

1. A mounting bracket assembly adaptable to all-terrain vehicles for mounting a rigid gun boot comprising:
   a) a base member having a vertical portion;
   b) a connecting means for attaching said base member to the cargo carrier of said all-terrain vehicles;
   c) a pivotal member interchangeably attached to said vertical portion;
   d) an "L" shaped bracket member having long and short portions said long portion having an elongated opening generally conforming to a specific molded gun boot configuration therein said bracket adaptively attached to said pivotal member;
   e) a plurality of fastening members for attaching said bracket to said pivotal member;
   e) a latch bar member incrementally attachable to said pivotal member; and
   f) a means for securing a rigid gun boot to said latch bar.

2. The mounting bracket assembly according to claim 1 wherein said pivotal member is incrementally adjustable relative to said base member.

3. The mounting bracket assembly according to claim 1 wherein said elongated opening in said adapter bracket member is fitted with a flexible polymeric edge molding.

4. The mounting bracket assembly according to claim 1 wherein said connecting means is a plurality of U-bolts and associated nuts and washers.

5. The mounting bracket assembly according to claim 1 wherein said means for securing a rigid gun boot to said latch bar comprises a removable pin passing through said latch bar with said gun boot in place.

6. A mounting bracket assembly adaptable to all-terrain vehicles for attaching a rigid gun boot, the mounting b racket comprising:
   a) a formed base plate having horizontal and vertical portions, each of said portions having a plurality of holes there through;
   b) a formed pivotal plate having horizontal and vertical portions, each of said portions having a plurality of holes there through;
   c) a fastening means for attaching and pivotally positioning said pivotal plate relative to said base plate;
   d) a formed "L" shaped bracket member with long and short side said long side having an elongated opening therein said bracket adaptively attached perpendicularly to said pivotal plate;
   e) fastening means for attaching said "L" shaped bracket to said pivotal plate;

f) a latch bar incrementally attached to said pivotal plate; and g) a pin means inserted through an aperture in said latch bar for securing a rigid gun boot to said latch bar.

7. The mounting bracket according to claim 6 wherein said "L" shaped bracket members are adapted to receive specific gun boots.

8. The mounting bracket according to claim 6 wherein said bracket further includes U-bolts for attaching said base plate to an all-terrain vehicle.

9. The mounting bracket according to claim 6 wherein said pivotal plate is positional longitudinally relative to said base plate by repositioning said fastening means within said plurality of holes in said vertical portion.

10. The mounting bracket according to claim 6 wherein said latch bar is positional to coincide with a retaining loop found on specific gun boots when said boots are inserted into said bracket member having an elongated opening therein for retaining said boot.

11. The mounting bracket according to claim 6 wherein said gun boot is secured to said latch bar by passing a portion of said gun boot over said latch bar.

12. The mounting bracket according to claim 6 wherein said elongated opening in said formed bracket member is lined with a polymeric edge molding.

13. A mounting bracket adaptable to all-terrain vehicles for attaching a rigid gun boot, the bracket comprising:

a) a formed base plate having horizontal and vertical portions, each of said portions having a plurality of holes there through;

b) a formed pivotal plate having horizontal and vertical portions, each of said portions having a plurality of holes there through;

c) a fastening means for attaching and pivotally positioning said pivotal plate to said base plate;

d) an "L" shaped bracket member having an elongated opening therein adapted to receive a specific gun boot configuration said bracket attached perpendicularly to said pivotal plate with a plurality of fasteners;

e) a latch bar having a plurality of apertures therein incrementally attachable to said pivotal plate;

f) fastening means for incrementally attaching said latch bar to said pivotal plate;

g) a removable pin insertable into one of said apertures in said latch bar, said pin having retaining means; and h) a plurality of U-bolts for securing said mounting bracket to an ATV cargo rack.

14. The mounting bracket according to claim 13 wherein said pivotal plate is positional longitudinally relative to said base plate by repositioning said fastening means within said plurality of holes in said vertical portion.

15. The mounting bracket according to claim 13 wherein said elongated opening in said formed bracket member is lined with a polymeric edge molding.

16. A method for securing a rigid gun boot to a cargo rack attached to an all-terrain vehicle comprising the steps of:

a) providing a bracket comprising:

i) a formed base plate having horizontal and vertical portions, each of said portions having a plurality of holes;

ii) a formed pivotal plate having horizontal and vertical portions, each of said portions having a plurality of holes;

iii) a fastening means for attaching and pivotally positioning said pivotal plate to said base plate;

iv) a formed "L" shaped bracket member having an elongated opening therein adapted to receive a specific gun boot configuration attached perpendicular to said pivotal plate; and v) a latch bar incrementally attached to said pivotal plate;

b) adapting said bracket to an all-terrain vehicle;

c) inserting a portion of a rigid gun boot, having a retaining loop mid way along its base, through said elongated opening until said retaining loop coincides with said latch bar;

d) pivoting and manipulating said gun boot in a manner whereby said latch bar extends through said retaining loop; and e) securing said gun boot in position with a pin passing through said latch bar.

17. The method according to claim 16 wherein said method further includes the step of adjustably positioning said pivotal plate longitudinally relative to said base plate.

18. The method according to claim 16 wherein said method further includes the step of rotationally positioning said pivotal plate relative to said base plate.

* * * * *